(12) United States Patent
Huang

(10) Patent No.: US 11,874,552 B2
(45) Date of Patent: Jan. 16, 2024

(54) DISPLAY DEVICE AND MANUFACTURING METHOD THEREOF

(71) Applicant: BOE TECHNOLOGY GROUP CO., LTD., Beijing (CN)

(72) Inventor: Hua Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 758 days.

(21) Appl. No.: 16/975,256

(22) PCT Filed: Nov. 29, 2019

(86) PCT No.: PCT/CN2019/122011
§ 371 (c)(1),
(2) Date: Aug. 24, 2020

(87) PCT Pub. No.: WO2021/102920
PCT Pub. Date: Jun. 3, 2021

(65) Prior Publication Data
US 2023/0161191 A1    May 25, 2023

(51) Int. Cl.
*G02F 1/1335* (2006.01)
*G02F 1/1333* (2006.01)
(Continued)

(52) U.S. Cl.
CPC .......... *G02F 1/133548* (2021.01); *B32B 7/12* (2013.01); *B32B 17/06* (2013.01); *G02F 1/1347* (2013.01); *G02F 1/133354* (2021.01); *G02F 1/133536* (2013.01); *B32B 37/12* (2013.01); *B32B 2255/26* (2013.01);
(Continued)

(58) Field of Classification Search
CPC ............. G02F 1/1333; G02F 1/133345; G02F 1/133302; G02F 1/133305; G02F 1/133354; G02F 1/1335; G02F 1/133528; G02F 1/133536; G02F 1/133548; G02F 1/1347; G02F 1/13471; G02F 2201/50; G02F 2202/103; G02F 2203/48; B32B 7/12;
(Continued)

(56) References Cited

U.S. PATENT DOCUMENTS 10,216,017 B2    2/2019  Chang et al.
11,256,135 B2 *  2/2022  Weindorf .......... G02F 1/133606
(Continued)

FOREIGN PATENT DOCUMENTS

CN    106444185    2/2017
CN    106932952    7/2017
(Continued)

OTHER PUBLICATIONS

Patent Translate CN 106932952.*

*Primary Examiner* — Thoi V Duong
(74) *Attorney, Agent, or Firm* — Leason Ellis LLP

(57) ABSTRACT

A display device and a manufacturing method thereof are provided. The manufacturing method of the display device includes: stacking a first substrate, a second substrate and a third substrate to form a liquid crystal display panel and a dimming panel, the liquid crystal display panel including the first substrate and the second substrate, the dimming panel including the second substrate and the third substrate, and forming a first polarizer on a side of the third substrate away from the second substrate.

14 Claims, 3 Drawing Sheets

(51) Int. Cl.
  *G02F 1/1347* (2006.01)
  *B32B 7/12* (2006.01)
  *B32B 17/06* (2006.01)
  *B32B 37/12* (2006.01)

(52) U.S. Cl.
  CPC ..... *B32B 2307/42* (2013.01); *B32B 2457/202* (2013.01); *G02F 2201/50* (2013.01); *G02F 2202/103* (2013.01); *G02F 2203/48* (2013.01)

(58) Field of Classification Search
  CPC ..... B32B 17/06; B32B 37/12; B32B 2255/26; B32B 2307/42; B32B 2457/202
  See application file for complete search history.

(56) References Cited

U.S. PATENT DOCUMENTS

| | | | | |
|---|---|---|---|---|
| 2010/0079706 | A1* | 4/2010 | Kim | G02B 5/3058 |
| | | | | 359/485.05 |
| 2012/0168065 | A1* | 7/2012 | Kaida | G03F 7/038 |
| | | | | 156/246 |
| 2018/0299726 | A1 | 10/2018 | Oka et al. | |
| 2019/0094435 | A1* | 3/2019 | Shen | G02F 1/133528 |

FOREIGN PATENT DOCUMENTS

| | | |
|---|---|---|
| CN | 206638846 | 11/2017 |
| CN | 108363250 | 8/2018 |
| CN | 207908726 | 9/2018 |
| CN | 108957841 | 12/2018 |
| CN | 109870859 | 6/2019 |
| CN | 110221496 | 9/2019 |
| CN | 110398865 | 11/2019 |
| CN | 210720943 | 6/2020 |
| JP | 10274780 | 10/1998 |

\* cited by examiner

DISPLAY DEVICE AND MANUFACTURING METHOD THEREOF

CROSS-REFERENCE TO RELATED PATENT APPLICATIONS

This application is a U.S. National Stage Application under 35 U.S.C. § 371 of International Patent Application No. PCT/CN2019/122011, filed Nov. 29, 2019, which is incorporated by reference in its entirety.

TECHNICAL FIELD

At least one embodiment of the present disclosure relates to a display device and a manufacturing method thereof.

BACKGROUND

With respect to a liquid crystal display panel, display quality of the display panel may be improved by combining a Local Dimming (LD) technology. The local dimming technology may greatly reduce power consumption, improve imaging contrast, increase the number of gray scales and reduce afterimages, etc.

SUMMARY

At least one embodiment of the present disclosure provides a manufacturing method of a display device, including: stacking a first substrate, a second substrate and a third substrate sequentially to form a liquid crystal display panel and a dimming panel; the liquid crystal display panel including the first substrate, the second substrate, and a display liquid crystal layer between the first substrate and the second substrate; the dimming panel including the second substrate, the third substrate, and a dimming liquid crystal layer between the second substrate and the third substrate; and forming a first polarizer on a side of the third substrate away from the second substrate. The first polarizer includes a first metal wire-grid polarizer and a transparent protective layer that are sequentially stacked, and the transparent protective layer is located on a side of the first metal wire-grid polarizer away from the third substrate.

For example, before forming the first polarizer on the side of the third substrate away from the second substrate, the method further includes: forming a dimming unit array on a side of the third substrate; cell-assembling the third substrate and the second substrate to form the dimming panel so that the side of the third substrate on which the dimming unit array is formed faces the second substrate, forming the first polarizer on the side of the third substrate away from the second substrate includes: forming the first polarizer, transferring and bonding the first polarizer to the side of the third substrate away from the second substrate.

For example, forming the first polarizer includes: sequentially forming a mechanical stripping layer, the transparent protective layer, the first metal wire-grid polarizer, a bonding protective layer and a storage protective layer that are stacked on a bearing substrate; transferring and bonding the first polarizer to the side of the third substrate away from the second substrate includes: bonding a side of the bonding protective layer away from the first metal wire-grid polarizer to the third substrate, after removing the mechanical stripping layer, the bearing substrate, and the storage protective layer.

For example, forming the first polarizer on the side of the third substrate away from the second substrate includes: sequentially forming the first metal wire-grid polarizer and the transparent protective layer that are stacked on one side of the third substrate to form the first polarizer, after forming the first polarizer on the side of the third substrate away from the second substrate, the method includes: forming a dimming unit array on the other side of the third substrate, a process temperature for forming the dimming unit array being not greater than 350° C.; cell-assembling the third substrate and the second substrate to form the dimming panel so that the side of the third substrate on which the dimming unit array is formed faces the second substrate.

For example, the transparent protective layer includes a first transparent protective layer in contact with the first metal wire-grid polarizer, and a second transparent protective layer on a side of the first transparent protective layer away from the first metal wire-grid polarizer.

For example, a material of the second transparent protective layer is colorless polymide; the second transparent protective layer has a transparency greater than 90%, a yellowness index less than 5, and a thickness less than 5 microns; and the second transparent protective layer is configured as a back film of the dimming panel.

For example, before forming the liquid crystal display panel, the method includes: forming a second polarizer on one side of the second substrate; forming a display unit array on the other side of the second substrate after forming the second polarizer, forming the liquid crystal display panel includes: cell-assembling the second substrate and the first substrate so that the side of the second substrate on which the display unit array is formed faces the first substrate.

For example, forming the second polarizer includes: sequentially forming a second metal wire-grid polarizer, a third transparent protective layer, a fourth transparent protective layer, and a temporary protective layer on the second substrate; after cell-assembling the second substrate and the first substrate so that the side of the second substrate on which the display unit array is formed faces the first substrate, the method comprises: removing the temporary protective layer; and cell-assembling the second substrate and the third substrate to form the dimming panel so that the side of the second substrate on which the second polarizer is formed faces the third substrate.

For example, a material of the third transparent protective layer is silicon oxide, a thickness of the third transparent protective layer is in a range from 1000 angstroms to 2000 angstroms; a material of the fourth transparent protective layer is amorphous silicon, and a thickness of the fourth transparent protective layer is in a range from 60 angstroms to 100 angstroms.

At least one embodiment of the present disclosure provides a display device, including: a first substrate; a second substrate configured to be cell-assembled with the first substrate to form a liquid crystal display panel; a third substrate configured to be cell-assembled with the second substrate to form a dimming panel; and a first polarizer located on a side of the third substrate away from the second substrate. The first polarizer includes a first metal wire-grid polarizer and a transparent protective layer that are sequentially stacked, and the transparent protective layer is located on a side of the first metal wire-grid polarizer away from the third substrate.

For example, the transparent protective layer includes a first transparent protective layer in contact with the first metal wire-grid polarizer, and a second transparent protective layer located on a side of the first transparent protective layer away from the first metal wire-grid polarizer.

For example, a material of the second transparent protective layer is colorless polymide; the second transparent protective layer has a transparency greater than 90%, a yellowness index less than 5, and a thickness less than 5 microns, and the second transparent protective layer is configured as a back film of the dimming panel.

For example, the first polarizer further includes a bonding protective layer located on a side of the first metal wire-grid polarizer facing the third substrate, and a side of the bonding protective layer away from the first metal wire-grid polarizer is bonded to the third substrate.

For example, a side of the second substrate facing the third substrate is provided with a second polarizer; the second polarizer includes a second metal wire-grid polarizer, a third transparent protective layer and a fourth transparent protective layer that are sequentially located on the second substrate; and the second metal wire-grid polarizer is between the third transparent protective layer and the second substrate.

For example, a material of the third transparent protective layer is silicon oxide, a thickness of the third transparent protective layer is in a range from 1000 angstroms to 2000 angstroms; a material of the fourth transparent protective layer is amorphous silicon, and a thickness of the fourth transparent protective layer is in a range from 60 angstroms to 100 angstroms.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
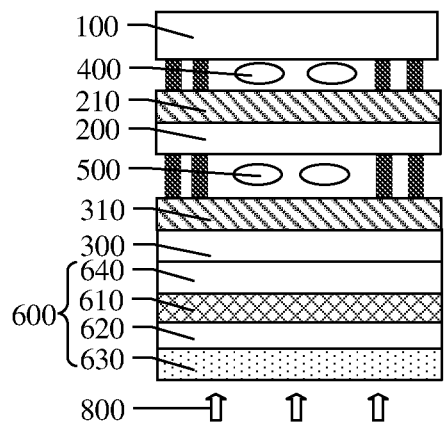
FIG. 1 is a partial structural schematic diagram of a display device provided by an example of an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In order to improve contrast of a liquid crystal display device, usually, backlight emitted by a backlight module may be controlled in different regions, and intensity of backlight in different regions may be dynamically adjusted according to gray-scale requirements of a display picture, so as to achieve relatively High Dynamic Contrast (HDR). Such a dynamically dimmable backlight module may be divided into a backlight module of an edge-lit type or a backlight module of a direct-lit type; the backlight module of the edge-lit type can only be controlled by partition in row direction or column direction, that is, it can only realize one-dimensional dynamic dimming, resulting in unsatisfactory dynamic contrast effect; while the backlight module of the direct-lit type can realize two-dimensional dynamic dimming through light-emitting elements arranged in matrix. However, in order to prevent Mura defect, a light mixing distance between the light-emitting elements and display panel needs to be larger, which results in a relatively great thickness of the backlight module, and a difficulty in implementing lightness and thinness.

In order to simultaneously improve contrast of the liquid crystal display device and implement design of lightness and thinness, the liquid crystal display device may adopt a double liquid crystal cell structure, with one liquid crystal cell used to dynamically adjusting the backlight in different regions, and the other liquid crystal cell used to normally display a display picture. The liquid crystal display device adopting the double liquid crystal cell structure can dynamically adjust the backlight in different regions through the liquid crystal cells, which may implement dynamic adjustment in different regions at a pixel level, so that a very high dynamic contrast may be achieved. However, the two liquid crystal cells usually include four display substrates, so after the two liquid crystal cells are superimposed, light transmittance is easily reduced, so that overall light efficiency of the liquid crystal display device is reduced. In addition, the double liquid crystal cell structure itself has technical problems such as rainbow patterns, water ripples, and moire patterns during a preparation process, which is difficult to meet a market demand for high-end products.

Embodiments of the present disclosure provide a display device and a manufacturing method thereof. The manufacturing method of the display device includes: stacking a first substrate, a second substrate and a third substrate to form a liquid crystal display panel and a dimming panel; the liquid crystal display panel including the first substrate, the second substrate, and a display liquid crystal layer between the first substrate and the second substrate; the dimming panel including the second substrate, the third substrate, and a dimming liquid crystal layer between the second substrate and the third substrate; and forming a first polarizer on a side of the third substrate away from the second substrate. The first polarizer includes a first metal wire-grid polarizer and a transparent protective layer that are sequentially stacked. The transparent protective layer is located on a side of the first metal wire-grid polarizer away from the third substrate. In the embodiment of the present disclosure, three substrates are used to form the display device including the liquid crystal display panel and the dimming panel, which may reduce rainbow patterns and water ripples while implementing high contrast; the first metal wire-grid polarizer serves as a reflective polarizer, which can cause light entering the dimming panel to be reflected multiple times by the first metal wire-grid polarizer, so as to improve light transmittance of the dimming panel, and further improve light transmittance of the display device; the transparent protective layer provided in the first polarizer not only serves as a protective layer in a fabrication process, but also serves as a protective layer of a final product, so that the manufacturing of the back film is saved to reduce the thickness of the display device, and at the same time, the light efficiency utilization rate can also be increased.

Hereafter, the manufacturing method of the display device and the display device provided in an embodiment of the present disclosure will be described below with reference to the drawings.

FIG. 1 is a partial structural schematic diagram of a display device provided by an example of an embodiment of the present disclosure. As shown in FIG. 1, a manufacturing method of a display device provided by the embodiment of the present disclosure includes stacking a first substrate 100, a second substrate 200 and a third substrate 300 to form a liquid crystal display panel and a dimming panel. The liquid crystal display panel includes the first substrate 100, the second substrate 200, and a display liquid crystal layer 400 located between the first substrate 100 and the second substrate 200; the dimming panel includes the second substrate 200, the third substrate 300, and a dimming liquid crystal layer 500 located between the second substrate 200 and the third substrate 300. That is, the liquid crystal display panel and the dimming panel share the second substrate. The first substrate, the second substrate and the third substrate here are all separate substrates, rather than substrates formed after bonding to other substrates, so in the display device, only three substrates are used to form a double liquid crystal cell.

As shown in FIG. 1, in the embodiment of the present disclosure, the liquid crystal display panel is used to implement a display function, and the dimming panel is used to control directions or intensities of backlight incident to the liquid crystal display panel as needed. For example, the dimming panel may implement switching between a narrow viewing angle and a wide viewing angle, and control of luminous intensities in respective positions of the liquid crystal display panel, etc. For example, the backlight may come from a backlight of a direct-lit type or a backlight of an edge-lit type; and light 800 emitted by the backlight passes through the dimming panel and then enters the liquid crystal display panel to implement display.

In the embodiment of the present disclosure, three substrates are used to form the display device including the liquid crystal display panel and the dimming panel, which may reduce rainbow patterns and water ripples while implementing high contrast.

For example, the first substrate 100, the second substrate 200 and the third substrate 300 may all be glass substrates, quartz substrates, or the like, or may also be flexible substrates, for example, polyimide substrates, for manufacturing a flexible display panel.

As shown in FIG. 1, the manufacturing method provided by the embodiment of the present disclosure further includes: forming a first polarizer 600 on a side of the third substrate 300 away from the second substrate 200. The first polarizer 600 includes a first metal wire-grid polarizer (WGP) 610 and a transparent protective layer that are sequentially stacked; the transparent protective layer is located on a side of the first metal wire-grid polarizer 610 away from the third substrate 300.

The above-described first metal wire-grid polarizer utilizes oscillation characteristics of free electrons on a metal surface, so that Transverse Electric (TE) polarized light whose electric-field direction is parallel to a wire-grid direction can excite the electrons to oscillate along the wire-grid direction, thereby causing reflection; Transverse Magnetic (TM) polarized light whose electric-field direction is perpendicular to a wire-grid direction cannot excite free electron oscillation due to limitation of a periodic structure, so TM polarized light mainly exhibits transmission characteristics. That is, almost all light components whose electric-field direction is parallel to the wire-grid direction are reflected by the metal wire-grid polarizing structure; in turn, most light whose electric-field direction is perpendicular to the wire-grid direction can pass through the metal wire-grid polarizing structure.

In the embodiment of the present disclosure, the first metal wire-grid polarizer serves as a reflective polarizer for reflecting light, so that light entering the dimming panel can be reflected multiple times by the first metal wire-grid polarizer, so as to improve light transmittance of the dimming panel, and further increase light transmittance of the display device.

In the embodiment of the present disclosure, the transparent protective layer provided on the side of the first metal wire-grid polarizer away from the third substrate not only serves as a protective layer in the fabrication process, but also serves as a protective layer of a final product, so that the manufacturing of the back film is saved to reduce the thickness of the display device, and at the same time, the light efficiency utilization rate can also be increased.

For example, as shown in FIG. 1, according to one example of the embodiment of the present disclosure, before forming the first polarizer 600 on the side of the third substrate 300 away from the second substrate 200, the method further includes: forming a dimming unit array 310 on a side of the third substrate 300; then cell-assembling the side of the third substrate 300 on which the dimming unit array 310 is formed and the second substrate 200. That is, before the first polarizer 600 is formed on the third substrate 300, the dimming unit array 310 has already been formed on the third substrate 300, and the third substrate 300 on which the dimming unit array 310 is formed and the second substrate 200 has also been cell-assembled.

For example, as shown in FIG. 1, the process of cell-assembling the second substrate 200 and the third substrate 300 includes injecting liquid crystal between the second substrate 200 and the third substrate 300 to form the dimming liquid crystal layer 500, and then cell-assembling the second substrate 200 and the third substrate 300 under a vacuum condition to form the dimming panel.

For example, the third substrate 300 becomes a dimming array substrate after the dimming unit array 310 is formed. The dimming unit array 310 may include a plurality of dimming units arranged in an array; and the dimming units each include a switching element to control a dimming state of each dimming unit. For example, the switching element may include a thin film transistor (TFT) and other elements for driving and controlling dimming states of the plurality of dimming units. A specific structure of the dimming element will not be limited in the embodiment of the present disclosure. For example, the dimming units each may further include a dimming electrode for controlling deflection of liquid crystal molecules in the dimming liquid crystal layer 500; the dimming electrode is connected with the switching element to control a voltage input to a first dimming electrode, so as to further control the dimming state of the dimming unit.

For example, a side of the dimming array substrate on which the dimming unit array is formed may also be formed with a plurality of signal lines intersecting with each other to define the plurality of dimming units. The above-described signal line may be connected with the first dimming electrode through the switching element to input a voltage to the first dimming electrode.

For example, according to an example of the embodiment of the present disclosure, the first polarizer is separately formed, then transferred and bonded to the side of the third substrate away from the second substrate; and before the first polarizer is bonded to the third substrate, the third substrate has been formed as the dimming array substrate. Because the array substrate is generally formed by a high-temperature process (e.g., an inorganic film layer such as a gate insulating layer requires a process temperature of about 380° C.), in the example, the dimming array substrate and the first polarizer are prepared separately, and are bonded after their respective preparation processes are completed, without considering that a high-temperature process of the array substrate affects characteristics of the respective film layers in the first polarizer, that is, fabrication of the first polarizer will not be limited by the fabrication process of the array substrate. Therefore, the characteristics of the first polarizer may be optimized as far as possible to improve the characteristics of the dimming panel, for example, the transparent protective layer included in the first polarizer may be made of a material with highest light transmittance to ensure light transmission performance of the dimming panel.

For example, before the first polarizer is bonded to the third substrate, not only fabrication of the array substrate in the dimming panel has been completed, but also fabrication of the array substrate in the liquid crystal display panel has been completed; so, none of the fabrication processes of the liquid crystal display panel and the dimming panel will affect the characteristics of the respective film layers in the first polarizer.

Figure 2:
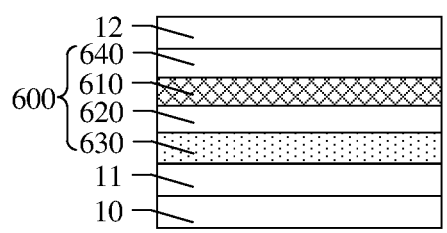
FIG. 2 to FIG. 4 are process schematic diagrams of forming a first polarizer in an example of an embodiment of the present disclosure.
Figure 3:
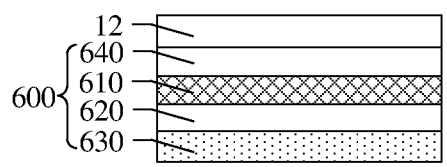
Figure 4:
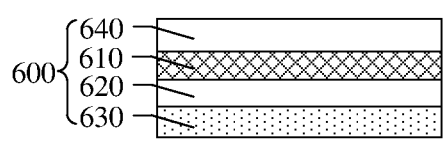

For example, FIG. 2 to FIG. 4 are process schematic diagrams of forming the first polarizer according to the embodiment of the present disclosure. As shown in FIG. 2, the step of forming the first polarizer includes: sequentially forming a mechanical stripping layer 11, transparent protective layers 620 and 630, the first metal wire-grid polarizer 610, a bonding protective layer 640 and a storage protective layer 12 that are stacked on a bearing substrate 10.

For example, the mechanical stripping layer 11 may be transferred on the bearing substrate 10 by using a transferring method with an Asahikasei Photosensitive Resin (APR) plate. The APR plate, also referred to as a relief plate, is mainly used in roller coating and printing of orientation liquid in a fabrication process of a Twisted Nematic panel (TN panel), a Super Twisted Nematic panel (STN panel) or a Thin Film Transistor panel (TFT panel), etc. in a liquid crystal display device industry, that is, transferring the orientation liquid to a glass substrate to form a uniform coating of the orientation liquid.

The embodiment of the present disclosure is not limited thereto, and the mechanical stripping layer 11 may also be formed on the bearing substrate 10 by coating. In the coating process, a coating material may be baked in an air environment of 100° C./2 mins or 350° C./60 mins, or in a nitrogen environment of 500° C./10 mins, which will not be limited in the embodiment of the present disclosure.

For example, a second transparent protective layer 630 is formed on a side of the mechanical stripping layer 11 away from the bearing substrate 10. For example, the second transparent protective layer 630 is made of Colorless Polymide (CPI); the second transparent protective layer 630 has a transparency greater than 90%, a yellowness index less than 5, and a thickness less than 5 microns.

The above-described yellowness index is a degree to which a color of a polymer material deviates from white, or a degree of yellowing, and may be measured with a yellowness index meter. General polyimide (PI) has a yellow color, which results in insufficient light efficiency. For example, general polyimide (PI) has a transparency not more than 85%, and a yellowness index not less than 10.

The above-described CPI refers to transparent and colorless polyimide, which may maintain all characteristics of general PI, and as a material of a transparent color, may play a role in improving light efficiency when applied to the display device. In the embodiment of the present disclosure, CPI is used instead of PI, which may effectively improve light transmittance of the display device.

For example, a polyimide material may be coated on the mechanical stripping layer 11. For example, the polyimide material is formed by chemical vapor deposition, in which a deposition temperature is in a range from 60° C. to 110° C., a pressure is below 10 PA, deposition time is 560 seconds, and then it is maintained at 350° C. for 1 hour.

For example, optimization may be performed by introducing fluorine-containing groups, alicyclic structures, sulfone-containing groups, flexible groups, large side groups and non-coplanar structures into a molecular structure of polyimide, to reduce intramolecular and intermolecular interaction forces, so as to reduce formation of Charge Transfer Complex (CTC), so that a certain alignment structure appears on a surface of the film, thereby preparing a colorless and transparent polyimide film.

Because temperatures of the preparation process of forming the colorless polyimide (CPI) and other subsequent preparation processes according to the embodiment of the present disclosure cannot be higher than 350° C., it is necessary to prevent the high-temperature process of forming the array substrates in the liquid crystal display panel and the dimming panel from affecting the characteristics of the colorless colyimide (CPI). The method of separately manufacturing the first polarizer and the respective array substrates is used in the present disclosure, so that the colorless polyimide (CPI) in the first polarizer will not be limited by the fabrication process of the array substrate, so as to reduce waste of the first polarizer process, which can not only better ensure light transmission performance of the display device, but also reduce product costs.

For example, a first transparent protective layer 620 may be coated on a side of the second transparent protective layer 630 away from the mechanical stripping layer 11. For example, the first transparent protective layer 620 may be made of a transparent material such as silicon oxide or silicon nitride.

For example, a metal layer, e.g., an aluminum layer, may be formed on a side of the first transparent protective layer 620 away from the second transparent protective layer 630, and then the first metal wire-grid polarizer 610 is formed by using a method such as a nano-imprinting or laser direct molding technology.

For example, the first transparent protective layer 620 is in direct contact with one surface of the first metal wire-grid polarizer 610 to protect the first metal wire-grid polarizer 610, which may prevent the first metal wire-grid polarizer 610 from being scratched. In addition, the first transparent protective layer 620 may also block water and oxygen to prevent external moisture from affecting the characteristics of the first metal wire-grid polarizer 610.

For example, after the first metal wire-grid polarizer 610 is formed, a bonding protective layer 640 is formed on a side of the first metal wire-grid polarizer 610 away from the first transparent protective layer 620. For example, the bonding protective layer 640 may be made of a transparent material such as silicon oxide or silicon nitride. The bonding protective layer 640 is in direct contact with the other surface of the first metal wire-grid polarizer 610 to protect the first metal wire-grid polarizer 610 and prevent the first metal wire-grid polarizer 610 from being scratched. In addition, the bonding protective layer 640 may also play a role in blocking water and oxygen, so as to prevent external moisture from affecting the characteristics of the first metal wire-grid polarizer 610.

For example, after the bonding protective layer 640 is formed, the method of separately forming the first polarizer 600 further includes bonding a storage protective layer 12 on a side of the bonding protective layer 640 away from the first metal wire-grid polarizer 610. For example, the storage protective layer 12 may be made of tetrapropyl fluoro elastomer (TPF), and the embodiment of the present disclosure includes but is not limited thereto.

Before the first polarizer is formed separately and transferred to be bonded to the third substrate of the dimming panel, the storage protective layer formed on a side of the first metal wire-grid polarizer away from the glass substrate may have a temporary protective effect on the first metal wire-grid polarizer and the bonding protective layer, so as to prevent the bonding protective layer from being damaged.

For example, as shown in FIG. 3, before preparing to bond the first polarizer 600 to the third substrate, the mechanical stripping layer 11 and the bearing substrate 10 need to be removed.

In an actual production process, the first polarizer formed in the above-described process is a large-sized motherboard; and the motherboard may be cut by laser to form a plurality of first polarizers bonded to and matching with third substrates of a plurality of dimming panels.

For example, as shown in FIG. 1 and FIG. 4, a method of bonding the first polarizer 600 to the side of the third substrate 300 away from the second substrate 200 includes: bonding the side of the bonding protective layer 640 away from the first metal wire-grid polarizer 610 to the third substrate 300 through pressure-sensitive double-sided adhesive (not shown) or other adhesive layer, after removing the storage protective layer 12. After bonding of the first polarizer is completed, the second transparent protective layer serves as a back film of the dimming panel to protect the dimming panel.

Because the first polarizer is an external polarizer of the liquid crystal display panel and the dimming panel, the second transparent protective layer not only serves as a protective layer in the fabrication process, but also serves as a back film of the final product to continue to protect the liquid crystal display panel and the dimming panel. A thickness of a back film in a general display device is in a range from 25 microns to 120 microns, while a thickness of the second transparent protective layer used as the back film according to the embodiment of the present disclosure is less than 5 microns, which may effectively reduce a thickness of the display device.

Figure 5:
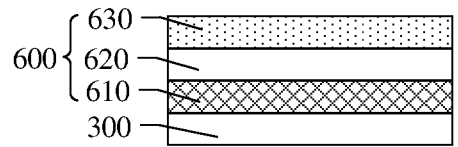
FIG. 5 to FIG. 6 are schematic diagrams of forming the first polarizer on a third substrate provided by another example of an embodiment of the present disclosure.
Figure 6:
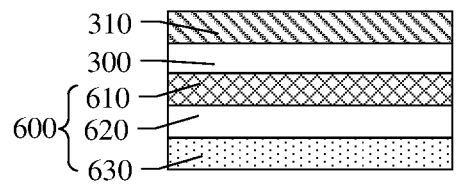

For example, FIG. 5 to FIG. 6 are schematic diagrams of forming the first polarizer on the third substrate provided by another example of the embodiment of the present disclosure. As shown in FIG. 5, a step of forming the first polarizer 600 on the third substrate 300 includes: sequentially forming the first metal wire-grid polarizer 610 and the transparent protective layers 620 and 630 that are stacked on one side of the third substrate 300.

For example, as shown in FIG. 5, a metal layer, e.g., an aluminum layer, is formed on the third substrate 300, and then the first metal wire-grid polarizer 610 is formed by using a method such as a nano-imprinting or laser direct molding technology. The first metal wire-grid polarizer in the example may have a structure, a characteristic, and a function the same as those of the first metal wire-grid polarizer in the examples shown in FIG. 1 to FIG. 4, and no details will be repeated here.

For example, as shown in FIG. 5, the first transparent protective layer 620 is formed on the side of the first metal wire-grid polarizer 610 away from the third substrate 300. The method for forming the first transparent protective layer 620 in the example as well as the structure, the characteristic, and the function of the formed first transparent protective layer 620 are the same as those of the first transparent protective layer in the examples shown in FIG. 1 to FIG. 4, and no details will be repeated here.

For example, as shown in FIG. 5, the second transparent protective layer 630 is formed on the side of the first transparent protective layer 620 away from the first metal wire-grid polarizer 610.

In the example, the second transparent protective layer 630 is made of Colorless Polymide (CPI); the second transparent protective layer 630 has a transparency greater than 90%, a yellowness index less than 5, and a thickness less than 5 microns. In the example, CPI is used to replace Polyimide (PI) with transparency not greater than 85% and a yellowness index not less than 10, which may effectively improve light transmittance of the display device. The second transparent protective layer has an effect of protecting the first metal wire-grid polarizer in the preparation process.

For example, as shown in FIG. 6, the third substrate 300 on which the first polarizer 600 is formed is turned; and the dimming unit array 310 is formed on the other side of the third substrate 300, that is, the first polarizer 600 and the dimming unit array 310 are formed on the third substrate 300 by a double-sided process.

The method for forming the dimming unit array 310 on the third substrate 300 in the example differs from the examples shown in FIG. 1 to FIG. 4 in that: there is no requirements on a preparation temperature for forming the dimming unit array on the third substrate in the examples shown in FIG. 1 to FIG. 4, while the process temperature for forming the dimming unit array in the example is not greater than 350° C.

The first polarizer in the examples shown in FIG. 1 to FIG. 4 is formed separately, then transferred and bonded to the third substrate on which the dimming unit array is formed, the preparation process of the first polarizer is not limited by the preparation process of the dimming unit array, and the preparation process of the dimming unit array is also not limited by the preparation process of the first polarizer; so the preparation process of the dimming unit array in the examples shown in FIG. 1 to FIG. 4 may still be a high-temperature process.

In the example, after the first polarizer is formed on one side of the third substrate, the double-sided process of forming the dimming unit array on the other side of the third substrate needs to take into account influence of both processes; because the first polarizer including the colorless polyimide (CPI) is firstly formed on the third substrate, the subsequent preparation process for forming the dimming unit array requires a temperature thereof to be not greater than 350° C., that is, the dimming array substrate is manufactured by a low-temperature process. Moreover, because the dimming panel only functions as an optical switch, the dimming array substrate formed by the low-temperature process does not affect dimming performance of the dimming panel.

In addition, because the first polarizer is an external polarizer of the liquid crystal display panel and the dimming panel, the second transparent protective layer (CPI) not only serves as a protective layer in the fabrication process, but also serves as a back film of the final product to continue to protect the liquid crystal display panel and the dimming panel. A thickness of a back film in a general display device is in a range from 25 microns to 120 microns, while a thickness of the second transparent protective layer used as the back film according to the embodiment of the present disclosure is less than 5 microns, which may effectively reduce the thickness of the display device.

Figure 7:
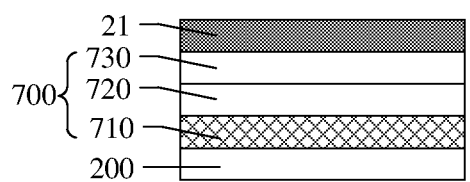
FIG. 7 is a schematic diagram of forming a second polarizer on a second substrate provided by another example of an embodiment of the present disclosure.

For example, FIG. 7 is a schematic diagram of forming a second polarizer on the second substrate provided by another example of the embodiment of the present disclosure. As shown in FIG. 7, a second polarizer 700 is formed on one side of the second substrate 200. For example, a step of forming a second polarizer 700 includes: sequentially forming a second metal wire-grid polarizer 710, a third transparent protective layer 720, a fourth transparent protective layer 730, and a temporary protective layer 21 on one side of the second substrate 200.

For example, as shown in FIG. 7, the step of forming the second polarizer may include forming a metal layer, e.g., an aluminum layer, on one side of the second substrate 200, and then forming the second metal wire-grid polarizer 710 by using a method such as a nano-imprinting or laser direct molding technology.

For example, a polarization direction of polarized light transmitted through the second metal wire-grid polarizer 710 shown in FIG. 7 is perpendicular to a polarization direction of polarized light transmitted through the first metal wire-grid polarizer 610 provided in the respective examples shown in FIG. 1 to FIG. 6.

For example, the second metal wire-grid polarizer 710 in the example may also be used as a reflective polarizer that reflects light, in which case, light reflected back by the second metal wire-grid polarizer 710 is depolarized by the first metal wire-grid polarizer 610 and reflected again; and the light passes through mirror reflection multiple times between the second metal wire-grid polarizer 710 and the first metal wire-grid polarizer 610, which obviously increases light transmittance.

For example, as shown in FIG. 7, the third transparent protective layer 720 is coated on a side of the second metal wire-grid polarizer 710 away from the second substrate 200, so as to protect the second metal wire-grid polarizer 710. The third transparent protective layer 720 may play a role of blocking water and oxygen, so as to avoid external moisture from affecting characteristics of the second metal wire-grid polarizer 710.

For example, as shown in FIG. 7, a fourth transparent protective layer 730 and a temporary protective layer 21 are sequentially formed on a side of the third transparent protective layer 720 away from the second metal wire-grid polarizer 710. The fourth transparent protective layer 730 located between the third transparent protective layer 720 and the temporary protective layer 21 may increase adhesion of an interface between the two and avoid abnormalities during the process.

For example, a thickness of the third transparent protective layer 720 is in a range from 1000 angstroms to 2000 angstroms; the third transparent protective layer 720 may be made of silicon oxide; the fourth transparent protective layer 730 may be made of amorphous silicon; and a thickness of the fourth transparent protective layer 730 is in a range from 60 angstroms to 100 angstroms. For example, the temporary protective layer 21 may be made of polyimide (PI).

Figure 8:
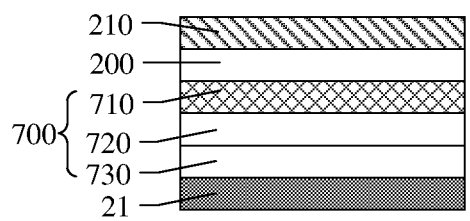
FIG. 8 is a schematic diagram of forming a display unit array in an example shown in FIG. 7.

For example, FIG. 8 is a schematic diagram of forming a display unit array in the example shown in FIG. 7. As shown in FIG. 8, after the second polarizer 700 is formed on one side of the second substrate 200, in a process of turning the second substrate 200 to form the display unit array 210 on the other side of the second substrate 200, the temporary protective layer 21 serves as a protective layer at a bottom layer, and is in contact with a process base, to prevent the process base from scratching the second metal wire-grid polarizer. That is, in the example, the second polarizer and the display unit array are respectively formed on two sides of the second substrate by a double-sided process.

For example, the second substrate on which the display unit array is formed is a display array substrate. The display unit array may include a plurality of display units arranged in an array; and the respective display units may include a pixel driving circuit, for example, include a structure used for driving and controlling a display state of the liquid crystal display panel, such as a thin film transistor (TFT) and a pixel electrode, as well as a component such as a signal line for supplying a signal to the pixel driving circuit. In the example, a semiconductor process may be used to form a structural element in the above-described display unit, and those skilled in the art may refer to conventional technologies.

As shown in FIG. 7 to FIG. 8, on the one hand, after the second polarizer 700 is formed on the second substrate 200, in the process of turning the second substrate 200 to form the display unit array 210, the temporary protective layer 21 is located at the lowest layer, to protect the second metal wire-grid polarizer 710 and prevent the second metal wire-grid polarizer 710 from being scratched. On the other hand, because the temporary protective layer 21 has high temperature resistance characteristics, a high-temperature process of forming the subsequent display unit array 210 will hardly affect the characteristics of the temporary protective layer 21.

Figure 9:
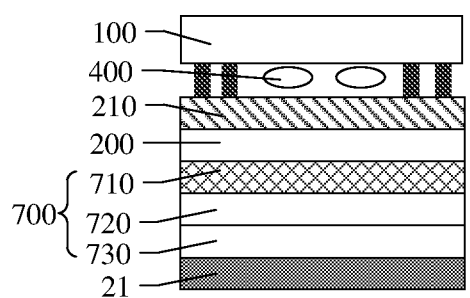
FIG. 9 is a schematic diagram of cell-assembling a side of the second substrate on which a display unit array is formed and a first substrate.

For example, FIG. 9 is a schematic diagram of cell-assembling a side of the second substrate on which the display unit array is formed and the first substrate. For example, a color filter layer (not shown) may be formed on one side of the first substrate 100; the color filter layer may include a plurality of pixel units arranged in an array; and each of the plurality of pixel units includes a plurality of different color sub-pixels, for example, red sub-pixels, green sub-pixels and blue sub-pixels.

For example, a side of the first substrate 100 on which the color filter layer is formed may further be formed with a structure such as an alignment film (not shown); a side of the first substrate 100 away from the second substrate may further be provided with a structure such as a polarizer (not shown); and a side of the second substrate 200 on which the display unit array 210 is formed may further be formed with a structure such as an alignment film (not shown). The side of the first substrate 100 on which the color filter layer is provided is opposite to the side of the second substrate 200 on which the display unit array 210 is provided; liquid crystal is injected between the first substrate 100 and the second substrate 200 to form the display liquid crystal layer 400; and then the first substrate 100 and the second substrate 200 are cell-assembled under a vacuum condition to form the liquid crystal display panel.

Figure 10:
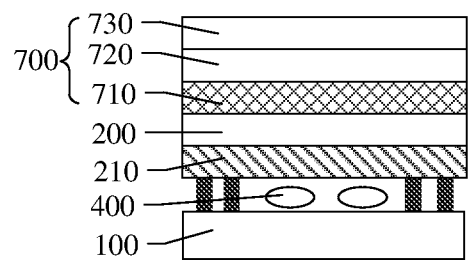
FIG. 10 is a structural schematic diagram after removing a temporary protective layer.

For example, FIG. 10 is a structural schematic diagram after removing the temporary protective layer. As shown in FIG. 9 to FIG. 10, after the first substrate 100 and the second substrate 200 are cell-assembled to form the liquid crystal display panel, the liquid crystal display panel is turned so that the temporary protective layer 21 is located at the uppermost layer, and then the temporary protective layer 21 is removed.

For example, the temporary protective layer may be etched by dry etching to remove the protective layer. For example, the protective layer may be over-etched to completely remove the temporary protective layer, and at this time, the third transparent protective layer 720 may sufficiently protect the second metal wire-grid polarizer 710.

Figure 11:
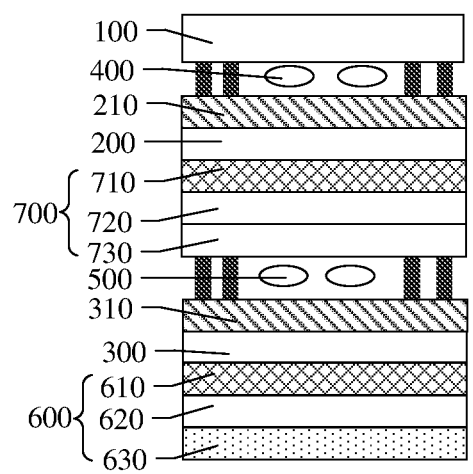
FIG. 11 is a structural schematic diagram of cell-assembling the second substrate in the liquid crystal display panel shown in FIG. 10 and the third substrate in the example shown in FIG. 6 to form a dimming panel.

For example, FIG. 11 is a structural schematic diagram of cell-assembling the second substrate in the liquid crystal display panel shown in FIG. 10 and the third substrate in the example shown in FIG. 6 to form the dimming panel. As shown in FIG. 10 to FIG. 11, the side of the second substrate 200 on which the second polarizer 700 is provided is opposite to the side of the third substrate 300 on which the first polarizer 600 is not formed; liquid crystal is injected between the third substrate 300 and the second substrate 200 to form the dimming liquid crystal layer 500; and then the third substrate 300 and the second substrate 200 are cell-assembled under a vacuum condition to form the dimming panel.

For example, in the embodiment of the present disclosure, a size of the display unit in the liquid crystal display panel is less than a size of the dimming unit in the dimming panel, that is, one dimming unit corresponds to a plurality of display units, so that dynamic local light control at pixel level can be realized, and better contrast can be obtained without generating large power consumption.

For example, in the embodiment of the present disclosure, the method for forming the liquid crystal display panel provided by the examples shown in FIG. 7 to FIG. 10 may be applied to the examples shown in FIG. 1 to FIG. 4 to form the display device; and at this time, none of the fabrication processes of the array substrate in the liquid crystal display panel and the array substrate in the dimming panel will affect the fabrication process of the independently formed first polarizer, which may optimize the characteristics of the first polarizer to a largest extent.

Of course, the embodiment of the present disclosure is not limited to forming the second polarizer by the above-described double-sided process; an integral sheet structure instead of the second polarizer having the wire-grid structure may also be formed directly on the second substrate, and then the second substrate and the third substrate are cell-assembled.

It should be noted that, no matter which method is used for forming the second polarizer, it cannot affect the preparation process of the liquid crystal display panel and a normal display effect thereof.

Another embodiment of the present disclosure provides a display device; referring to FIG. 1 and FIG. 11, the display device provided by this embodiment includes a first substrate 100; a second substrate 200 configured to be cell-assembled with the first substrate 100 to form a liquid crystal display panel; a third substrate 300 configured to be cell-assembled with the second substrate 200 to form a dimming panel; and a first polarizer 600 located on a side of the third substrate 300 away from the second substrate 200. The first polarizer 600 includes a first metal wire-grid polarizer 610 and a transparent protective layer that are sequentially stacked; and the transparent protective layer is located on a side of the first metal wire-grid polarizer 610 away from the third substrate 300.

In the embodiment of the present disclosure, the display device including the liquid crystal display panel and the dimming panel only includes three substrates, which may reduce rainbow patterns and water ripples while implementing high contrast; the first metal wire-grid polarizer serves as a reflective polarizer, which can cause light entering the dimming panel to be reflected multiple times by the first metal wire-grid polarizer, to improve light transmittance of the dimming panel, and further improve light transmittance of the display device; the transparent protective layer in the first polarizer not only serves as a protective layer in a fabrication process, but also serves as a protective layer of a final product, so that the manufacturing of the back film is saved to reduce the thickness of the display device, and at the same time, the light efficiency utilization rate can also be increased.

For example, as shown in FIG. 1 and FIG. 11, the display device provided by the embodiment of the present disclosure may be the display device formed by using the manufacturing method provided by any one of the examples shown in FIG. 1 to FIG. 11. In the embodiment of the present disclosure, the liquid crystal display panel is used to implement a display function, and the dimming panel is used to control directions or intensities of backlight incident to the liquid crystal display panel as needed, for example, the dimming panel may implement switching between a narrow viewing angle and a wide viewing angle, and control of luminous intensities in respective positions of the liquid crystal display panel, etc. For example, the backlight may come from a backlight of a direct-lit type or a backlight of an edge-lit type; and light 800 emitted by the backlight passes through the dimming panel and then is incident to the liquid crystal display panel to implement display.

For example, as shown in FIG. 1 and FIG. 11, the transparent protective layer includes a first transparent protective layer 620 in contact with the first metal wire-grid polarizer 610, and a second transparent protective layer 630 located on a side of the first transparent protective layer 620 away from the first metal wire-grid polarizer 610.

For example, the first transparent protective layer 620 may be made of a transparent material such as silicon oxide or silicon nitride.

For example, the first transparent protective layer 620 is in direct contact with one surface of the first metal wire-grid polarizer 610 to protect the first metal wire-grid polarizer 610, which may prevent the first metal wire-grid polarizer 610 from being scratched. In addition, the first transparent protective layer 620 may also block water and oxygen to prevent external moisture from affecting characteristics of the first metal wire-grid polarizer 610.

For example, the second transparent protective layer 630 is made of Colorless Polymide (CPI); the second transparent protective layer 630 has a transparency greater than 90%, a yellowness index less than 5, and a thickness less than 5 microns. In the embodiment of the present disclosure, CPI is used instead of PI, which may effectively improve light transmittance of the display device. In addition, because the first polarizer is an external polarizer of the liquid crystal display panel and the dimming panel, the second transparent protective layer (CPI) not only serves as a protective layer in the fabrication process, but also serves as a back film of a final product to continue to protect the liquid crystal display panel and the dimming panel. A thickness of a back film in a general display device is in a range from 25 microns to 120 microns, while a thickness of the second transparent protective layer used as the back film according to the embodiment of the present disclosure is less than 5 microns, which may effectively reduce a thickness of the display device.

For example, as shown in FIG. 1 to FIG. 4, the first polarizer 600 further includes a bonding protective layer 640 located on a side of the first metal wire-grid polarizer 610 facing the third substrate 300; and a side of the bonding protective layer 640 away from the first metal wire-grid polarizer 610 is bonded to the third substrate 300.

For example, the bonding protective layer 640 may be made of a transparent material such as silicon oxide or silicon nitride. The bonding protective layer 640 is in direct contact with the other surface of the first metal wire-grid polarizer 610 to protect the first metal wire-grid polarizer 610 and prevent the first metal wire-grid polarizer 610 from being scratched. In addition, the bonding protective layer 640 may also play a role in blocking water and oxygen, so as to prevent external moisture from affecting the characteristics of the first metal wire-grid polarizer 610.

For example, a side of the second substrate 200 facing the third substrate 300 is provided with a second polarizer 700; the second polarizer 700 includes a second metal wire-grid polarizer 710, a third transparent protective layer 720 and a fourth transparent protective layer 730 that are sequentially located on the second substrate 200; and the second metal wire-grid polarizer 710 is located between the third transparent protective layer 720 and the second substrate 200. The third transparent protective layer 720 protects the second metal wire-grid polarizer 710. The third transparent protective layer 720 may play a role of blocking water and oxygen, so as to avoid external moisture from affecting characteristics of the second metal wire-grid polarizer 710.

For example, a thickness of the third transparent protective layer 720 is in a range from 1000 angstroms to 2000 angstroms; and a thickness of the fourth transparent protective layer 730 is in a range from 60 angstroms to 100 angstroms.

For example, a polarization direction of polarized light transmitted by the second metal wire-grid polarizer 710 is perpendicular to a polarization direction of polarized light transmitted by the first metal wire-grid polarizer 610.

For example, the second metal wire-grid polarizer 710 may also be used as a reflective polarizer that reflects light, in which case, light reflected back by the second metal wire-grid polarizer 710 is depolarized by the first metal wire-grid polarizer 610 and reflected again; and the light passes through mirror reflection multiple times between the second metal wire-grid polarizer 710 and the first metal wire-grid polarizer 610, which obviously increases light transmittance.

For example, the display device provided by the embodiment of the present disclosure may be a large-sized display device such as a television or an electronic picture frame. Of course, the embodiment of the present disclosure includes but is not limited thereto, and the display device may also be a computer, a laptop, a mobile phone, a tablet personal computer, a navigator, and any other electronic product having a display function.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

What is claimed is:

1. A manufacturing method of a display device, comprising:
   stacking a first substrate, a second substrate and a third substrate sequentially to form a liquid crystal display panel and a dimming panel; the liquid crystal display panel comprising the first substrate, the second substrate, and a display liquid crystal layer between the first substrate and the second substrate; the dimming panel comprising the second substrate, the third substrate, and a dimming liquid crystal layer between the second substrate and the third substrate; and
   forming a first polarizer on a side of the third substrate away from the second substrate,
   wherein the first polarizer comprises a first metal wire-grid polarizer and a transparent protective layer that are sequentially stacked, and the transparent protective layer is located on a side of the first metal wire-grid polarizer away from the third substrate;
   the transparent protective layer comprises a first transparent protective layer in contact with the first metal wire-grid polarizer, and a second transparent protective layer on a side of the first transparent protective layer away from the first metal wire-grid polarizer, a material of the second transparent protective layer is colorless polymide; the second transparent protective layer has a transparency greater than 90%, a yellowness index less than 5, and a thickness less than 5 microns; and the second transparent protective layer is configured as a back film of the dimming panel.

2. The manufacturing method according to claim 1, wherein before forming the first polarizer on the side of the third substrate away from the second substrate, the method further comprises:
   forming a dimming unit array on a side of the third substrate;
   cell-assembling the third substrate and the second substrate to form the dimming panel so that the side of the third substrate on which the dimming unit array is formed faces the second substrate,
   forming the first polarizer on the side of the third substrate away from the second substrate comprises:

forming the first polarizer, transferring and bonding the first polarizer to the side of the third substrate away from the second substrate.

3. The manufacturing method according to claim 2, wherein forming the first polarizer comprises: sequentially forming a mechanical stripping layer, the transparent protective layer, the first metal wire-grid polarizer, a bonding protective layer and a storage protective layer that are stacked on a bearing substrate;
transferring and bonding the first polarizer to the side of the third substrate away from the second substrate comprises: bonding a side of the bonding protective layer away from the first metal wire-grid polarizer to the third substrate, after removing the mechanical stripping layer, the bearing substrate, and the storage protective layer.

4. The manufacturing method according to claim 2, wherein before forming the liquid crystal display panel, the method comprises:
forming a second polarizer on one side of the second substrate;
forming a display unit array on the other side of the second substrate after forming the second polarizer,
forming the liquid crystal display panel comprises: cell-assembling the second substrate and the first substrate so that the side of the second substrate on which the display unit array is formed faces the first substrate.

5. The manufacturing method according to claim 1, wherein forming the first polarizer on the side of the third substrate away from the second substrate comprises: sequentially forming the first metal wire-grid polarizer and the transparent protective layer that are stacked on one side of the third substrate to form the first polarizer,
after forming the first polarizer on the side of the third substrate away from the second substrate, the method comprises: forming a dimming unit array on the other side of the third substrate, a process temperature for forming the dimming unit array being not greater than 350° C.;
cell-assembling the third substrate and the second substrate to form the dimming panel so that the side of the third substrate on which the dimming unit array is formed faces the second substrate.

6. The manufacturing method according to claim 5, wherein before forming the liquid crystal display panel, the method comprises:
forming a second polarizer on one side of the second substrate;
forming a display unit array on the other side of the second substrate after forming the second polarizer,
forming the liquid crystal display panel comprises: cell-assembling the second substrate and the first substrate so that the side of the second substrate on which the display unit array is formed faces the first substrate.

7. The manufacturing method according to claim 1, wherein before forming the liquid crystal display panel, the method comprises:
forming a second polarizer on one side of the second substrate;
forming a display unit array on the other side of the second substrate after forming the second polarizer,
forming the liquid crystal display panel comprises: cell-assembling the second substrate and the first substrate so that the side of the second substrate on which the display unit array is formed faces the first substrate.

8. The manufacturing method according to claim 7, wherein forming the second polarizer comprises: sequentially forming a second metal wire-grid polarizer, a third transparent protective layer, a fourth transparent protective layer, and a temporary protective layer on the second substrate;
after cell-assembling the second substrate and the first substrate so that the side of the second substrate on which the display unit array is formed faces the first substrate, the method comprises: removing the temporary protective layer; and
cell-assembling the second substrate and the third substrate to form the dimming panel so that the side of the second substrate on which the second polarizer is formed faces the third substrate.

9. The manufacturing method according to claim 8, wherein a material of the third transparent protective layer is silicon oxide, a thickness of the third transparent protective layer is in a range from 1000 angstroms to 2000 angstroms; a material of the fourth transparent protective layer is amorphous silicon, and a thickness of the fourth transparent protective layer is in a range from 60 angstroms to 100 angstroms.

10. A display device, comprising:
a first substrate;
a second substrate, configured to be cell-assembled with the first substrate to form a liquid crystal display panel;
a third substrate, configured to be cell-assembled with the second substrate to form a dimming panel; and
a first polarizer, located on a side of the third substrate away from the second substrate,
wherein the first polarizer comprises a first metal wire-grid polarizer and a transparent protective layer that are sequentially stacked, and the transparent protective layer is located on a side of the first metal wire-grid polarizer away from the third substrate;
the transparent protective layer comprises a first transparent protective layer in contact with the first metal wire-grid polarizer, and a second transparent protective layer located on a side of the first transparent protective layer away from the first metal wire-grid polarizer, a material of the second transparent protective layer is colorless polyimide; the second transparent protective layer has a transparency greater than 90%, a yellowness index less than 5, and a thickness less than 5 microns, and the second transparent protective layer is configured as a back film of the dimming panel.

11. The display device according to claim 10, wherein the first polarizer further comprises a bonding protective layer located on a side of the first metal wire-grid polarizer facing the third substrate, and a side of the bonding protective layer away from the first metal wire-grid polarizer is bonded to the third substrate.

12. The display device according to claim 11, wherein a side of the second substrate facing the third substrate is provided with a second polarizer; the second polarizer comprises a second metal wire-grid polarizer, a third transparent protective layer and a fourth transparent protective layer that are sequentially located on the second substrate; and the second metal wire-grid polarizer is between the third transparent protective layer and the second substrate.

13. The display device according to claim 12, wherein a material of the third transparent protective layer is silicon oxide, a thickness of the third transparent protective layer is in a range from 1000 angstroms to 2000 angstroms; a material of the fourth transparent protective layer is amorphous silicon, and a thickness of the fourth transparent protective layer is in a range from 60 angstroms to 100 angstroms.

14. A display device, comprising:
a first substrate;
a second substrate, configured to be cell-assembled with the first substrate to form a liquid crystal display panel;
a third substrate, configured to be cell-assembled with the second substrate to form a dimming panel; and
a first polarizer, located on a side of the third substrate away from the second substrate,
wherein the first polarizer comprises a first metal wire-grid polarizer and a transparent protective layer that are sequentially stacked, and the transparent protective layer is located on a side of the first metal wire-grid polarizer away from the third substrate;
the first polarizer further comprises a bonding protective layer located on a side of the first metal wire-grid polarizer facing the third substrate, and a side of the bonding protective layer away from the first metal wire-grid polarizer is bonded to the third substrate, a side of the second substrate facing the third substrate is provided with a second polarizer; the second polarizer comprises a second metal wire-grid polarizer, a third transparent protective layer and a fourth transparent protective layer that are sequentially located on the second substrate; and the second metal wire-grid polarizer is between the third transparent protective layer and the second substrate, a material of the third transparent protective layer is silicon oxide, a thickness of the third transparent protective layer is in a range from 1000 angstroms to 2000 angstroms; a material of the fourth transparent protective layer is amorphous silicon, and a thickness of the fourth transparent protective layer is in a range from 60 angstroms to 100 angstroms.

\* \* \* \* \*